United States Patent [19]

Purvis

[11] Patent Number: 5,367,951
[45] Date of Patent: Nov. 29, 1994

[54] GRILL STEAMER TRAY

[76] Inventor: William L. Purvis, 555 Golden Pond Ct., Jacksonville, Fla. 32259

[21] Appl. No.: 84,923

[22] Filed: Jul. 1, 1993

[51] Int. Cl.⁵ ............................................. A47J 37/07
[52] U.S. Cl. ....................................... 99/450; 99/446; 99/447
[58] Field of Search ................. 99/446, 447, 417, 450, 99/444, 400; 126/369, 369.3

[56] References Cited

U.S. PATENT DOCUMENTS

| | | | |
|---|---|---|---|
| 2,466,859 | 4/1949 | Northup | 99/446 |
| 3,199,438 | 8/1965 | Myler et al. | 99/446 |
| 3,212,426 | 10/1965 | Lewus | 126/369 |
| 4,373,511 | 2/1983 | Miles et al. | 126/369 |
| 4,793,324 | 12/1988 | Cafferro | 126/369 |
| 4,869,163 | 9/1989 | Haskins | 99/446 |
| 5,044,266 | 9/1991 | Geogaris | 99/446 |
| 5,105,725 | 4/1992 | Haglund | 99/446 |

*Primary Examiner*—David A. Scherbel
*Assistant Examiner*—Reginald L. Alexander

[57] ABSTRACT

A grill steamer tray both for steaming food that is being cooked on a grill and for collecting grease drippings from the food to prevent an undesirable flaming of the grill. The tray includes a plurality of depressions that may be filled with water to steam the food as well as to collect the grease drippings. A plurality of openings are provided between the depressions to allow heat and smoke to pass through the openings for cooking purposes. The tray further includes removable finned tray liners that fit into the depressions to provide for easier cleaning of the tray after use.

2 Claims, 4 Drawing Sheets

5,367,951

GRILL STEAMER TRAY

BACKGROUND OF THE INVENTION

1. Field of the Invention

The present invention relates to grills and more particularly pertains to grill apparatuses which may be utilized both for steaming food that is being cooked on a grill and for collecting grease drippings from the food.

2. Description of the Prior Art

The use of grill apparatuses is known in the prior art. More specifically, grill apparatuses heretofore devised and utilized for the purpose of cooking food are known to consist basically of familiar, expected and obvious structural configurations, notwithstanding the myriad of designs encompassed by the crowded prior art which have been developed for the fulfillment of countless objectives and requirements.

For example, U.S. Pat. No. 3,457,852 illustrates a reversible multiple cooking oven, steamer, grill, and griddle in which a single cover may be employed for either of the two cooking surfaces.

Another patent of interest is U.S. Pat. No. 4,869,163 which discloses a smoking unit for gas grills that may be utilized to support both a quantity of smoke-generating wood chips and a quantity of water in a gas grill.

While these devices fulfill their respective, particular objectives and requirements, the aforementioned patents do not describe a removable tray that may be utilized both for steaming food that is being cooked on a grill and for collecting grease drippings from the food to prevent an undesirable flaming of the grill.

In this respect, the grill steamer tray according to the present invention substantially departs from the conventional concepts and designs of the prior art, and in so doing provides an apparatus primarily developed for the purpose of both steaming food that is being cooked on a grill and collecting grease drippings from the food.

SUMMARY OF THE INVENTION

In view of the foregoing disadvantages inherent in the known types of grill apparatuses now present in the prior art, the present invention provides a new grill steamer tray construction wherein the same can be utilized both for steaming food that is being cooked on a grill and for collecting grease drippings from the food. As such, the general purpose of the present invention, which will be described subsequently in greater detail, is to provide a new grill steamer tray apparatus which has many of the advantages of the grill apparatuses mentioned heretofore and many novel features that result in a grill steamer tray which is not anticipated, rendered obvious, suggested, or even implied by any of the prior art grill apparatuses, either alone or in any combination thereof.

To attain this, the present invention essentially comprises a grill steamer tray both for stewing food that is being cooked on a grill and for collecting grease drippings from the food. The tray may be placed below the food in a typical grill without a substantial modification thereof. The tray includes a plurality of depressions which may be filled with water to steam the food as well as to collect the grease drippings. A plurality of openings are provided between the depressions to allow heat and smoke to pass through the openings for cooking purposes.

A second embodiment of the present invention further includes removable finned tray liners that fit into the depressions of the tray so as to provide for easier cleaning of the tray after use. The fins of the tray liners project above the water placed in the tray liners so as to enhance both the heat conduction to the water and the heat convection to the food.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grill steamer tray apparatus which has many of the advantages of the steamer trays mentioned heretofore and many novel features that result in a grill steamer tray which is not anticipated, rendered obvious, suggested, or even implied by any of the prior art steamer trays, either alone or in any combination thereof.

It is another object of the present invention to provide a new grill steamer tray which may be easily and efficiently manufactured and marketed.

It is a further object of the present invention to provide a new grill steamer tray which is of a durable and reliable construction.

An even further object of the present invention is to provide a new grill steamer tray which is susceptible of a low cost of manufacture with regard to both materials and labor, and which accordingly is then susceptible of low prices of sale to the consuming public, thereby making such grill steamer trays economically available to the buying public.

Still yet another object of the present invention is to provide a new grill steamer tray which provides in the apparatuses and methods of the prior art some of the advantages thereof, while simultaneously overcoming some of the disadvantages normally associated therewith.

Still another object of the present invention is to provide a new grill steamer tray which may be utilized both for steaming food that is being cooked on a grill and for collecting grease drippings from the food.

Yet another object of the present invention is to provide a new grill steamer tray that may be utilized with a convention grill without a substantial modification thereof.

Even still another object of the present invention is to provide a new grill steamer tray which includes a plurality of finned tray liners.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
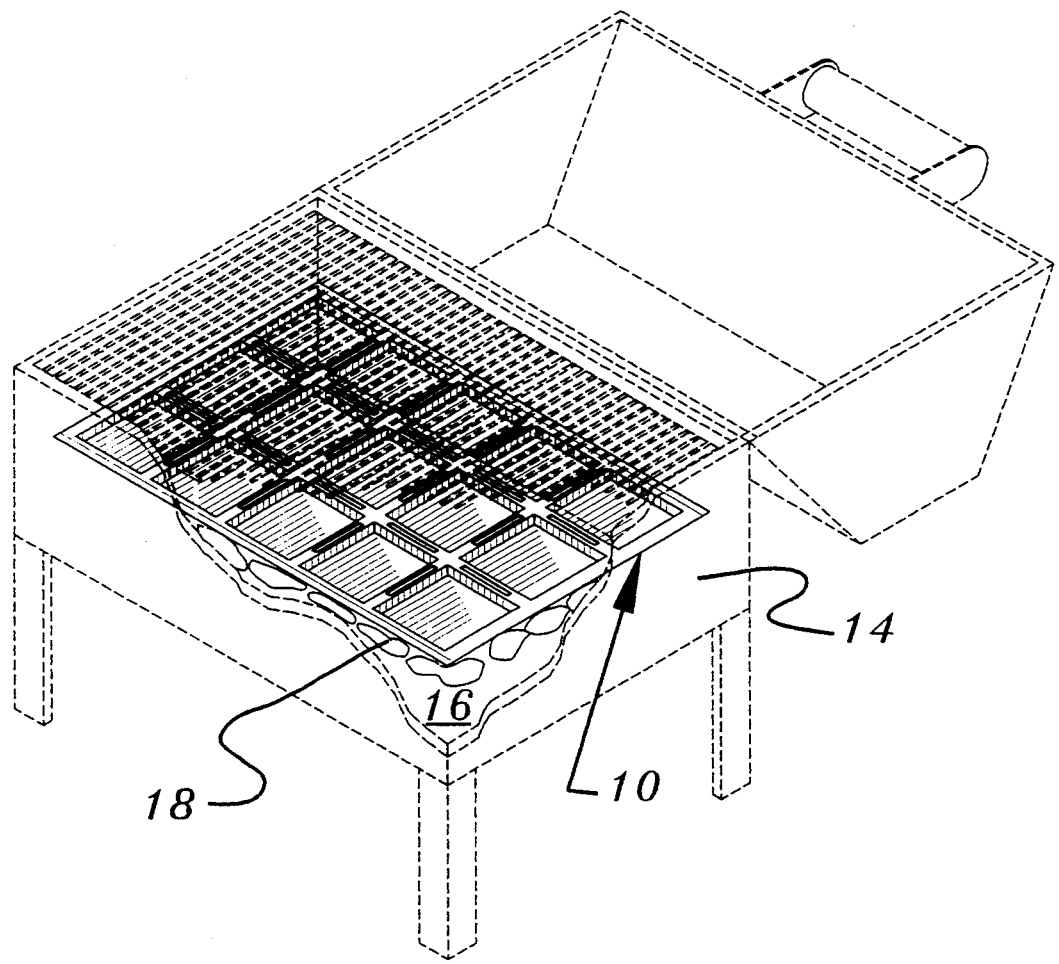
FIG. 1 is a perspective view of a grill steamer tray comprising the present invention as placed within a conventional grill.
Figure 2:
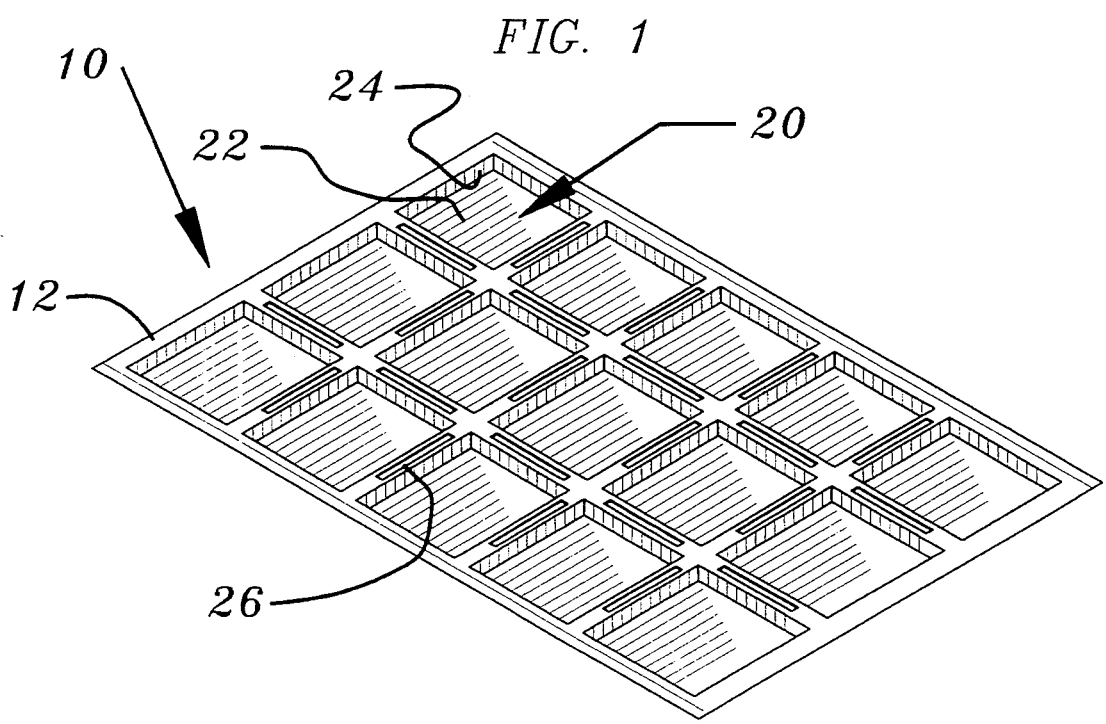
FIG. 2 is a perspective view of the present invention.

With reference now to the drawings, and in particular to FIGS. 1–4 thereof, a new grill steamer tray embodying the principles and concepts of the present invention and generally designated by the reference numeral 10 will be described.

More specifically, it will be noted that the grill steamer tray 10 comprises a substantially rectangular main body 12 that is formed of a flat, preferably heat conductive material such as a metal, which is sized to fit within a grill 14 in an area 16 where charcoal 18 and the like commonly resides. The main body 12 includes a plurality of substantially rectangular depressions 20 which are integrally formed in a Juxtaposed relationship to each other on the main body. Each of the plurality of depressions 20 is substantially similar in shape and size and includes a bottom plate 22 which is supported by a side wall 24 that circumscribes and integrally connects the bottom plate to the main body as can best be seen in FIG. 2. The depressions 20 may be of any conceivable size necessary for their intended purpose and it should be understood that the invention 10 may be constructed with any number of depressions therein. Furthermore, because of the similarity of each of the plurality of depressions 20, only one of the depressions is labeled in FIGS. 2–3.

Figure 3:
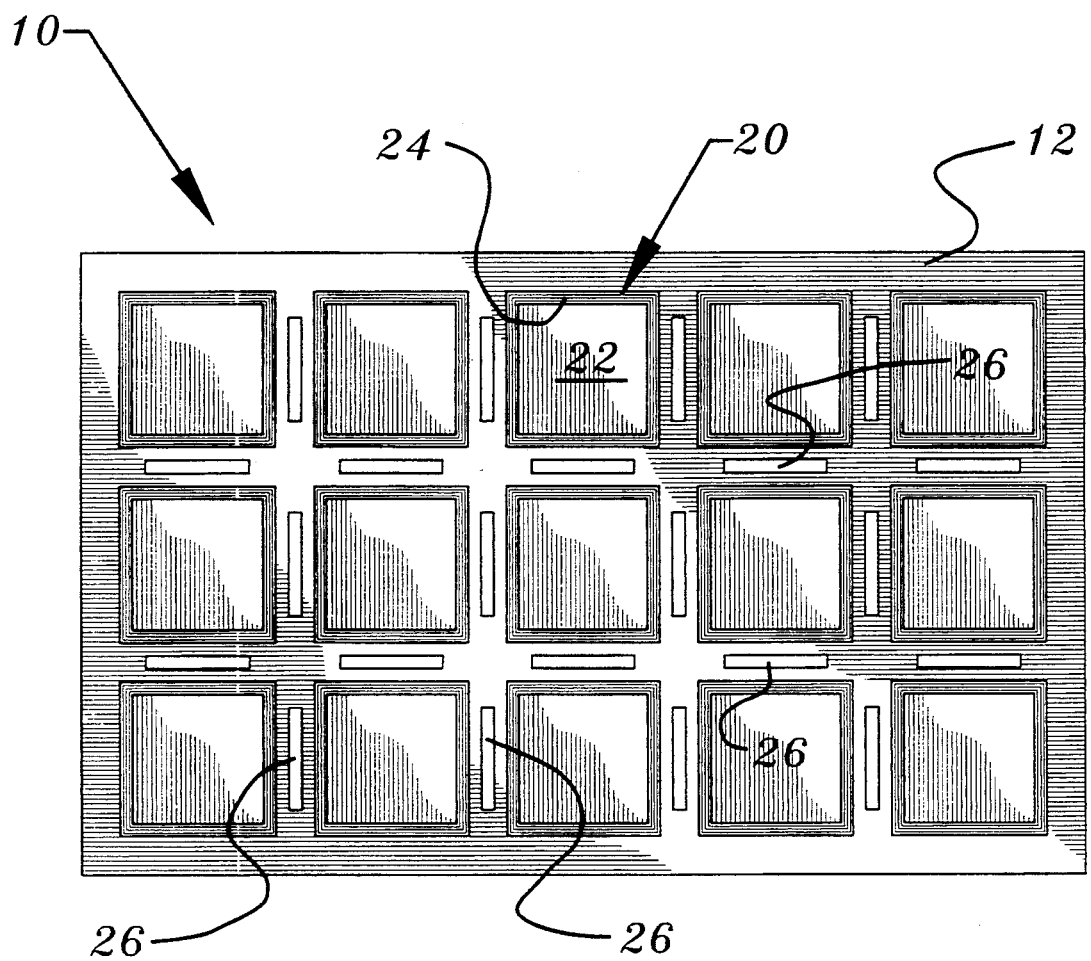
FIG. 3 is a top plan view of the invention.
Figure 4:
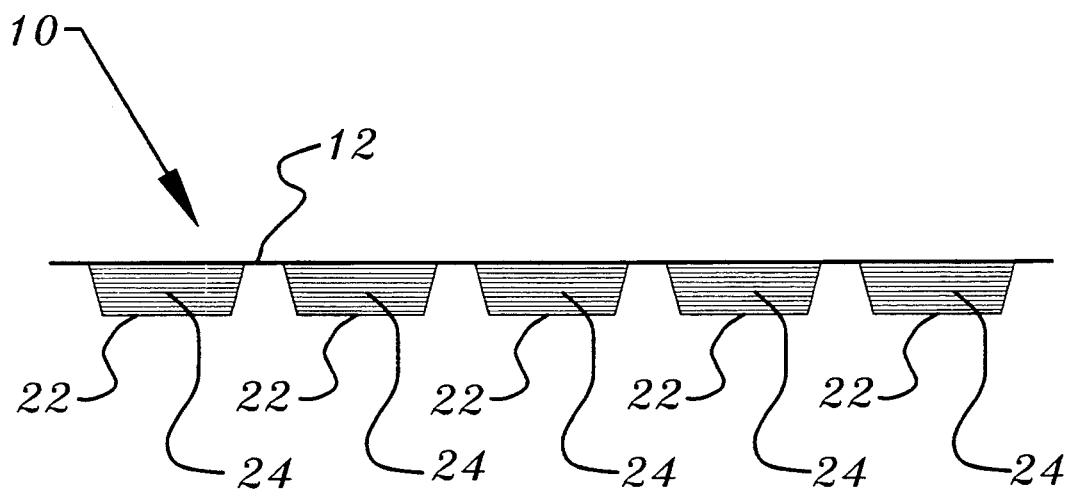
FIG. 4 is a side elevation view of the grill steamer tray.
Figure 5:
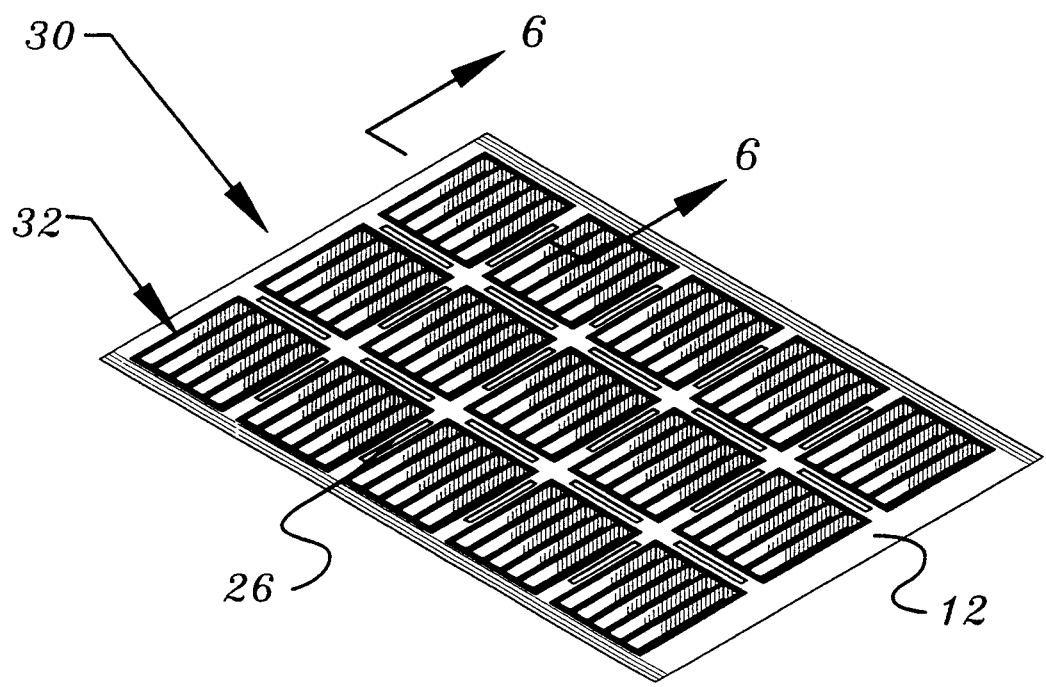
FIG. 5 is a perspective view of a second embodiment of the present invention.
Figure 6:
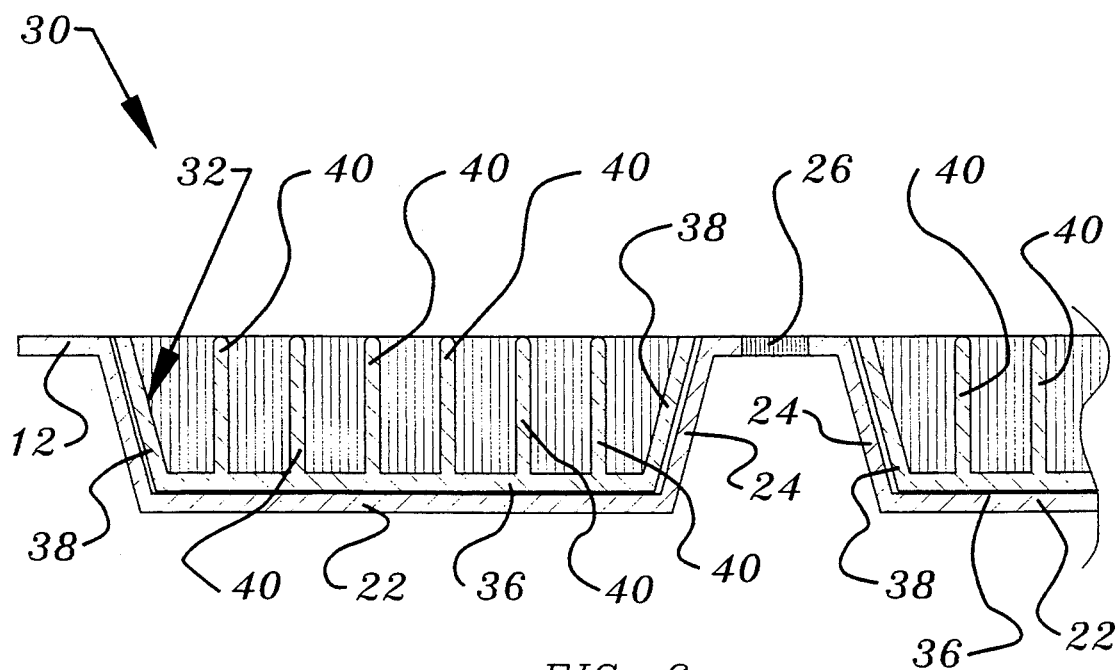
FIG. 6 is a cross section view taken along line 6—6 of FIG. 5.
Figure 7:
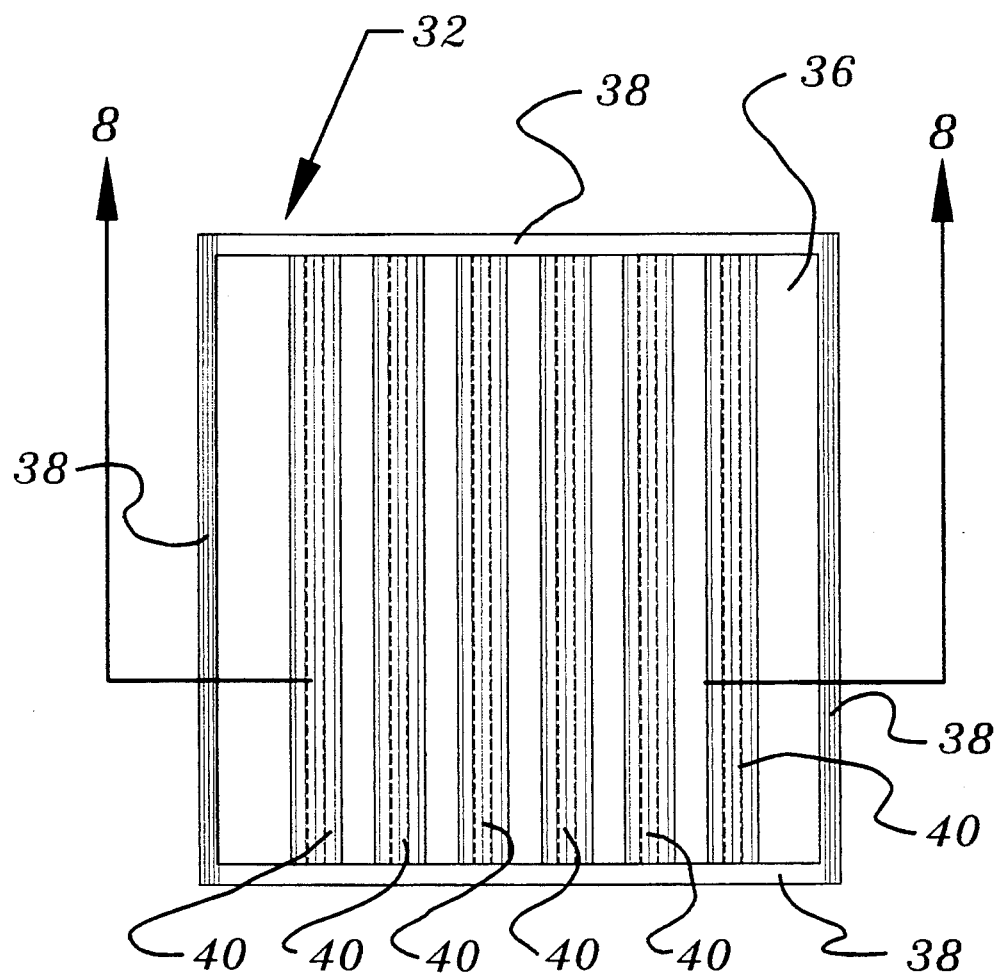
FIG. 7 is a top plan view of a portion of the second embodiment.
Figure 8:
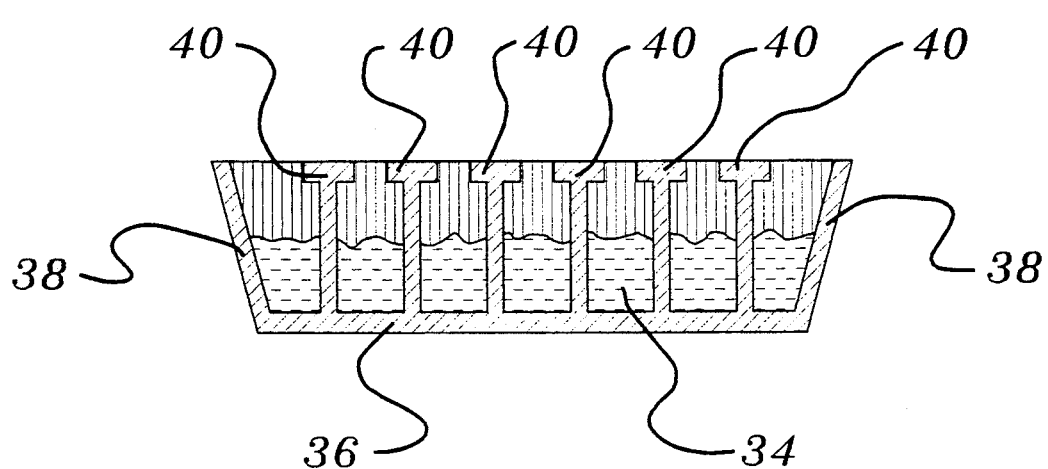
FIG. 8 is a cross section view taken along line 8—8 of FIG. 7.

To allow a passage of both heat and smoke from a grill through the tray, a plurality of apertures 26 extend through the main body 12. Each one of the plurality of apertures 26 is shaped in an substantially elongated rectangular form that will allow the apertures to reside in an abutting relationship to the plurality of depressions 20 as best illustrated in FIG. 3.

In use, the grill steamer tray may be placed below the food of a conventional grill 14. The plurality of depressions 20 can be utilized to retain a quantity of water of other fluid to be heated while being further utilized to catch and retain grease drippings that cause undesirable flaming of the grill.

Comprising all of the features of the foregoing embodiment 10 and generally designated by the reference numeral 30 is a second embodiment that is illustrated in FIGS. 5–8. It can be seen that the second embodiment 30 further comprises a plurality of removable tray liners 32. Each of the tray liners 32 is operable to fit within one of the plurality of depressions 20 to retain water 34 or other fluids therein. The tray liners 32 are each comprised of a bottom portion 36 which is sized to fit within one of the depressions 20 and reside therein. Integrally or otherwise connected to the bottom portion 36 is a side portion 38 that circumscribes the bottom portion and substantially follows a contour defined by the side wall 24 against which it resides. The tray liners 36 are operable to be easily removed from the main body 12 for cleaning or refilling.

The tray liners 32 further include a plurality of fins 40, as illustrated in FIGS. 5–8, which project from the bottom portion 36 of each tray liner 32 to a level defined by the uppermost end of the side portion 38 so that heat from the bottom plate 22 of the main body 12 may be conducted through the fin and convected to food thereabove. The fins 40 may be of any shape deemed appropriate for their intended use as well of the alternative use of allowing food to reside thereon. A substantially T-shaped fin 40 may be seen in FIGS. 7–8 that will provide such an alternative use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grill steamer tray comprising:

a substantially rectangular main body positionable within a grill between a grate of said grill and charcoal of said grill, said main body having a plurality of substantially square depressions integrally formed in a juxtaposed, spaced relationship to one another, each of said depressions including a planar bottom plate and a side wall which circumscribes said bottom plate and integrally connects said bottom plate to said main body, said main body further having a plurality of apertures extending therethrough, with each of said apertures being positioned between said depressions so as to allow heat and smoke from said charcoal to pass around said depressions and through said apertures to food being cooked on said grill, said depressions being operable to retain a fluid therein to generate steam upon heating of said tray by said charcoal of said grill, with said depressions further being operable to capture and retain grease droppings from said food, with fluid communication between said depressions being precluded by said side walls such that said grease droppings are contained within individual depressions, thereby precluding contamination of said fluid within adjacent depressions by said grease droppings.

2. The grill steamer tray as recited in claim 1, and further comprising a plurality of tray liners, with each of said tray liners being positioned within an individual one of said plurality of depressions, said tray liners each comprising a bottom portion having a side portion which circumscribes said bottom portion and extends upwardly therefrom to substantially follow a contour of said side wall, said tray liners each further comprising a plurality of fins extending upwardly from said bottom portion thereof, each of said fins being substantially T-shaped such that heat conducted to said bottom portion of said tray liners will be transferred through said fins and convected from an uppermost top area of said T-shaped fins to said food.

* * * * *